United States Patent
Meyers

(10) Patent No.: US 8,053,138 B2
(45) Date of Patent: Nov. 8, 2011

(54) STABILIZED FUEL CELL FLOW FIELD

(75) Inventor: Jeremy P. Meyers, West Hartford, CT (US)

(73) Assignee: UTC Power Corporation, South Windsor, CT (US)

( * ) Notice: Subject to any disclaimer, the term of this patent is extended or adjusted under 35 U.S.C. 154(b) by 761 days.

(21) Appl. No.: 12/094,520

(22) PCT Filed: Dec. 29, 2005

(86) PCT No.: PCT/US2005/047675
§ 371 (c)(1),
(2), (4) Date: May 21, 2008

(87) PCT Pub. No.: WO2008/105751
PCT Pub. Date: Sep. 4, 2008

(65) Prior Publication Data
US 2010/0221641 A1   Sep. 2, 2010

(51) Int. Cl.
*H01M 8/10* (2006.01)
*H01M 8/02* (2006.01)

(52) U.S. Cl. ........................................ 429/512

(58) Field of Classification Search ........... 429/512–514
See application file for complete search history.

(56) References Cited

U.S. PATENT DOCUMENTS

| | | | |
|---|---|---|---|
| 4,622,831 A | 11/1986 | Grupa | |
| 5,252,410 A * | 10/1993 | Wilkinson et al. | 429/438 |
| 6,485,857 B2 * | 11/2002 | Perry et al. | 429/413 |
| 6,555,261 B1 | 4/2003 | Lewinski et al. | |
| 6,558,827 B1 | 5/2003 | Reiser | |
| 6,569,518 B2 | 5/2003 | Yadav et al. | |
| 6,673,480 B1 | 1/2004 | Wilkinson et al. | |
| 6,756,142 B2 | 6/2004 | Muthuswamy et al. | |
| 6,855,453 B2 | 2/2005 | Bett et al. | |
| 6,884,536 B1 * | 4/2005 | Hatoh et al. | 429/433 |
| 2004/0062979 A1 | 4/2004 | Beckmann et al. | |
| 2005/0221152 A1 | 10/2005 | Turpin et al. | |

FOREIGN PATENT DOCUMENTS

| | | |
|---|---|---|
| EP | 1298753 | 4/2003 |
| EP | 1304756 | 4/2003 |
| EP | 1441406 | 7/2004 |
| JP | 03230478 A * | 10/1991 |
| JP | 03295167 A * | 12/1991 |

OTHER PUBLICATIONS

Supplementary European Search Report dated Dec. 15, 2010.
International Search Report and Written Opinion dated Aug. 22, 2008.

* cited by examiner

*Primary Examiner* — Gregg Cantelmo
(74) *Attorney, Agent, or Firm* — Carlson, Gaskey & Olds, P.C.

(57) ABSTRACT

A fuel cell (10) includes a cathode catalyst (26) for receiving a first reactant and an anode catalyst (24) for receiving an expected amount of a second reactant. The cathode catalyst (26) and the anode catalyst (24) respectively catalyze the first reactant and the second reactant to produce an electrochemical reaction that generates a flow of electrons between the cathode catalyst (26) and the anode catalyst (24) The amount of the first reactant consumed in the electrochemical reaction corresponds to a threshold amount of the second reactant needed to generate a forward flow of the electrons from the anode catalyst (24) to the cathode catalyst (26). A portion (42) of a fuel cell flow field includes a feature (54, 60, 80, $W_1$, $D_1$) that restricts consumption of the first reactant.

9 Claims, 5 Drawing Sheets

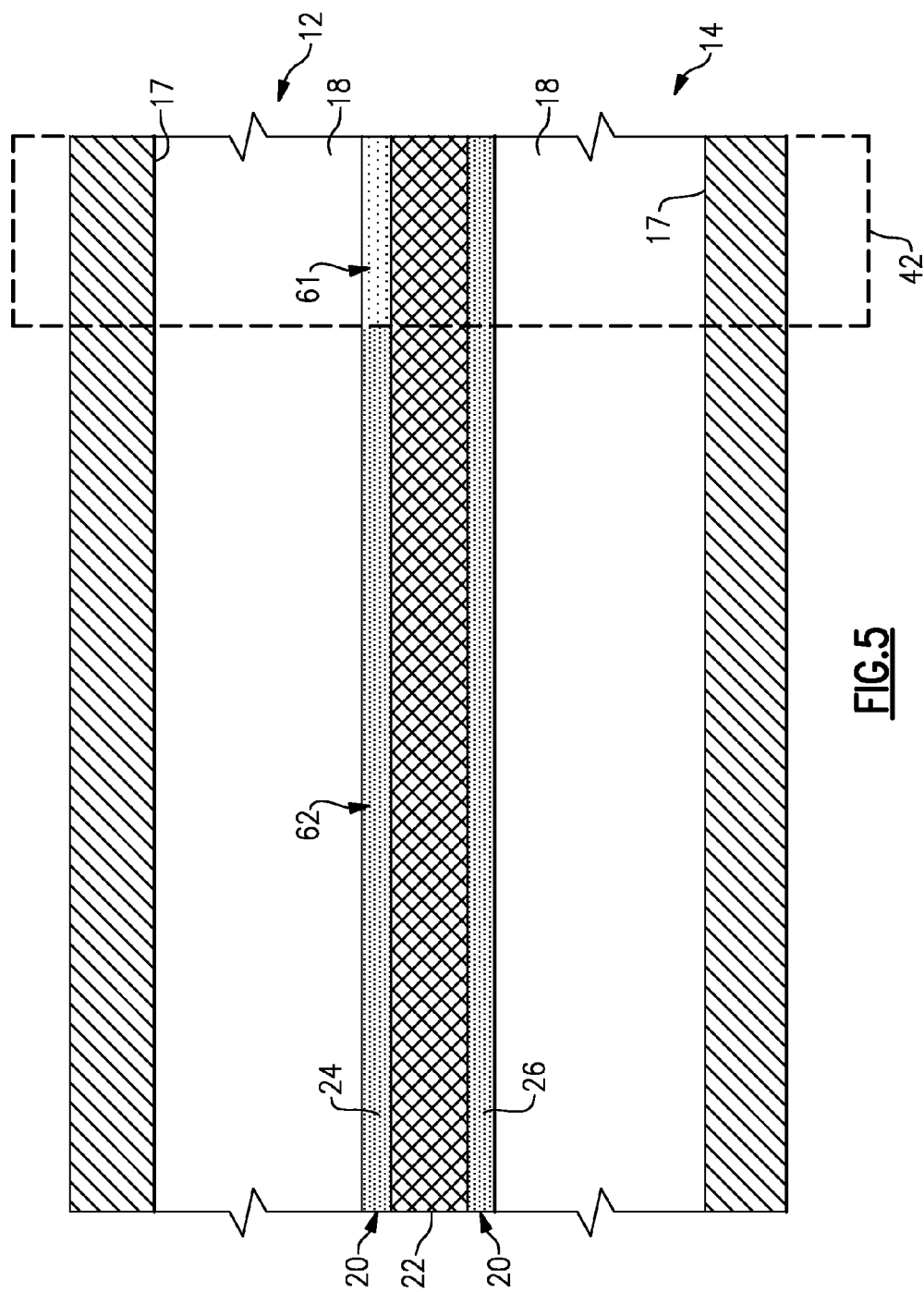

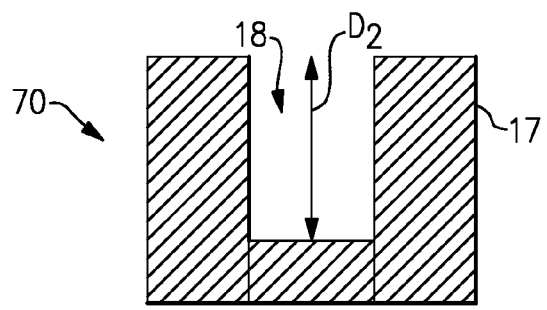
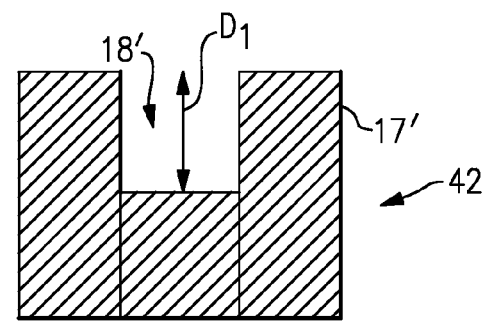
FIG.7C          FIG.7B
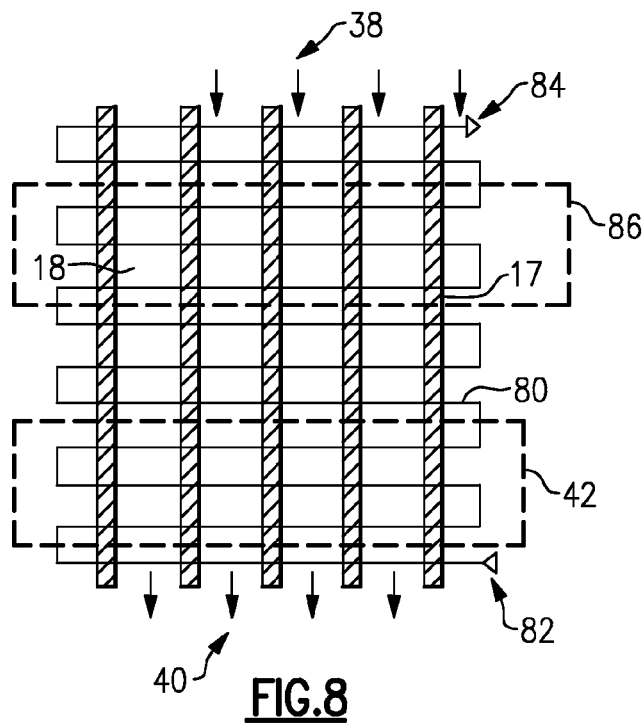
FIG.8

STABILIZED FUEL CELL FLOW FIELD

FIELD OF THE INVENTION

This invention generally relates to fuel cells and, more particularly, to flow fields for fuel cells.

DESCRIPTION OF THE RELATED ART

Fuel cells are widely known and used for generating electricity in a variety of applications. A typical fuel cell utilizes reactant gases, such as hydrogen and oxygen (e.g., from air), to generate an electrical current. Typically, the fuel cell includes adjacent flow fields having flow channels that receive respective reactant gases. Each flow field distributes the reactant gas through a gas distribution layer to a respective anode catalyst or cathode catalyst adjacent to an ion-conducting polymer exchange membrane (PEM) to generate the electrical current. Typically, a network of carbon particles supports each of the cathode and anode catalysts and forms part of an external circuit for the electrical current.

A typical fuel cell generates electricity from an electrochemical reaction in which an oxidant, typically oxygen from air, and a fuel, typically hydrogen, combine to form a by-product, which is water. Oxygen continuously passes over the cathode catalyst and hydrogen passes over the anode catalyst. The anode catalyst separates hydrogen protons from electrons. The protons pass through the PEM, while the electrons flow through the external electrical circuit. The protons recombine with the electrons and react with oxygen at the cathode catalyst to form the water by-product.

Under some conditions, such as low hydrogen partial pressure in a localized area of the anode catalyst, there is insufficient hydrogen to sustain the electrochemical reaction in that area. This may result in localized current reversal from the above-described normal fuel cell operating mode and lead to reaction conditions that degrade the cathode catalyst, carbon support or both. For example, water at the positive electrode electrolyzes to form oxygen, hydrogen, and free electrons. The hydrogen protons pass through the PEM and the electrons released in the fuel-rich regions of the negative electrode flow to the fuel-starved region of the negative electrode. The absence of a proton and electron source at low potentials in the fuel-starved region increases the electrical potential at the cathode catalyst, which causes degradative reactions between water and the carbon support to form carbon dioxide. Degradation ultimately leads to loss of catalytic and electrical performance and, in turn, lower fuel cell efficiency.

This invention addresses the need for reducing or eliminating fuel cell catalyst degradation to maintain stable fuel cell operation.

SUMMARY OF THE INVENTION

One example device for use in a fuel cell includes a cathode catalyst for receiving a first reactant and an anode catalyst for receiving an expected amount of a second reactant. The cathode catalyst and the anode catalyst respectively catalyze the first reactant and the second reactant to produce an electrochemical reaction that generates a flow of electrons between the anode catalyst and the cathode catalyst. Because the kinetics of hydrogen oxidation are very facile, the rate of the fuel cell reactions are generally constrained by the rates of the first reactant to the cathode catalyst and of ohmic conduction through the conductive layers of the fuel cell. The amount of the first reactant consumed in the electrochemical reaction corresponds to a threshold amount of the second reactant needed to generate a forward flow of the electrons from the anode catalyst to the cathode catalyst. A portion of a fuel cell flow field includes a feature that restricts consumption of the first reactant to maintain the threshold amount below the expected amount of the second reactant.

One example method includes restricting consumption of a first reactant at a cathode catalyst of a fuel cell to reduce a threshold amount of a second reactant needed at an anode catalyst to generate a forward flow of the electrons from the anode catalyst to the cathode catalyst.

The above examples are not intended to be limiting. Additional examples are described below. The various features and advantages of this invention will become apparent to those skilled in the art from the following detailed description. The drawings that accompany the detailed description can be briefly described as follows.

BRIEF DESCRIPTION OF THE DRAWINGS

FIG. 5 is a cross-sectional view that illustrates an embodiment of a catalyst having a reduced amount of catalytic material

FIG. 7B is a cross-sectional view along the section line shown in FIG. 7A that illustrates the channel depth of the parallel channels.

FIG. 7C is a cross-sectional view along the section line shown in FIG. 7A that illustrates the channel depth of the interdigitated channels.

FIG. 8 is a cross-sectional view that illustrates an embodiment having a cooling passage.

DETAILED DESCRIPTION OF THE PREFERRED EMBODIMENTS

Figure 1:
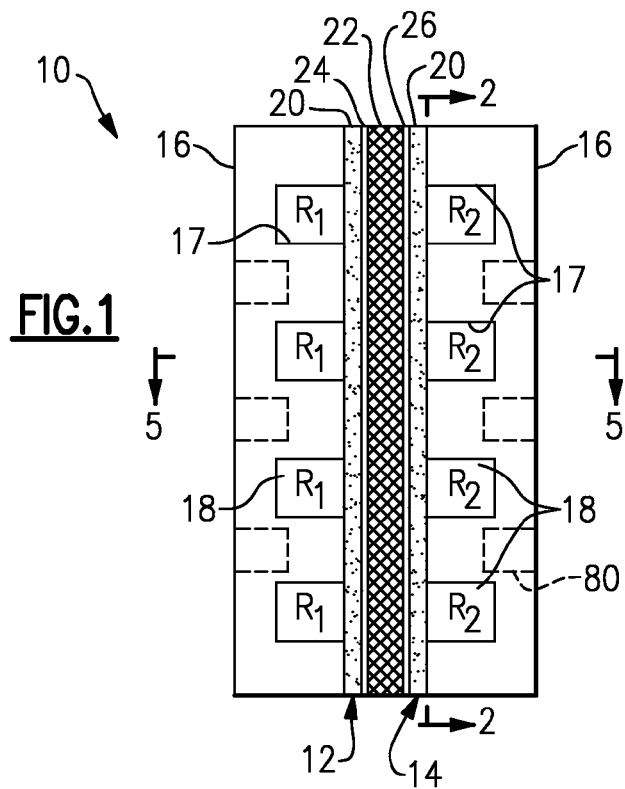
FIG. 1 schematically illustrates selected portions of a fuel cell stack.

FIG. 1 schematically illustrates selected portions of an example fuel cell 10 for generating electricity. In this example, a cathode side 12 receives a reactant gas $R_1$ and an anode side 14 receives a reactant gas $R_2$ to generate an electric current using a known reaction. Each of the cathode side 12 and the anode side 14 includes a flow field plate 16, such as a molded plate, porous plate, or other type of plate, having channel walls 17 and channels 18 that extend between the channel walls 17 for distributing the reactant gasses $R_1$ and $R_2$ over the respective cathode side 12 and anode side 14.

In the illustrated example, a gas exchange layer 20 is located adjacent each of the flow field plates 16. A polymer exchange membrane (PEM) 22 spaces a cathode catalyst 24 from an anode catalyst 26 between the gas exchange layers 20. In some examples, the cathode catalyst 24 and the anode catalyst 26 each include a catalytic material deposited on a support, such as a carbon cloth.

Figure 2:
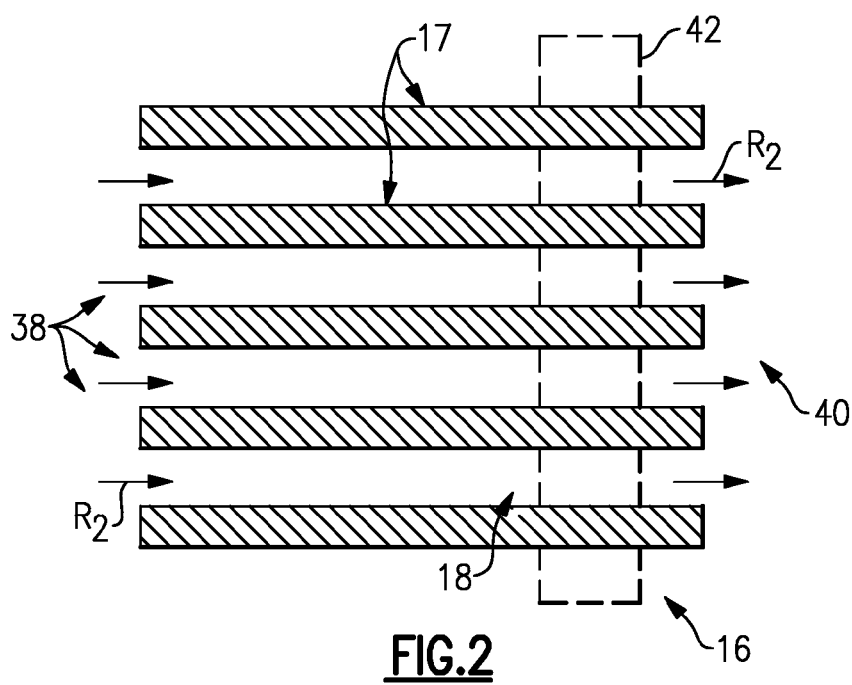
FIG. 2 is a cross-sectional view taken along the lines shown in FIG. 1 that illustrates an embodiment having a feature that restricts the amount of reactant gas consumed.

FIG. 2 shows the anode side 14 flow field plate 16 according to the section lines shown in FIG. 1 to demonstrate one feature of the operation of the fuel cell 10. The reactant gas $R_2$ is fed into the channels 18 through an entrance 38 and flows through the channels 18 toward an exit 40. The reactant gas $R_2$ in the channels 18 at least partially diffuses through the gas exchange layer 20 (FIG. 1) toward the anode catalyst 26. Likewise, the reactant gas $R_1$ flows through channels 18 on the cathode side 12 and diffuses toward the cathode catalyst 24. The cathode catalyst 24 and anode catalyst 26 catalyze the respective reactant gases $R_1$ and $R_2$ to produce an electrochemical reaction that results in generation of an electrical current (i.e., flow of electrons) between the cathode catalyst 24 and the anode catalyst 26.

Generally, the partial pressure (or alternatively the concentration for example) of the reactant gases $R_1$ and $R_2$ decreases along the channels 18 from the entrance 38 to the exit 40 as the cathode catalyst 24 and the anode catalyst 26 respectively consume the reactant gases $R_1$ and $R_2$ in the electrochemical reaction. The partial pressures, concentrations, or other indication of the amounts of the reactant gases $R_1$ and $R_2$ along the channels 18 can be estimated in a known manner.

In some portions of the fuel cell 10, such as near the entrance 38, the partial pressures are relatively high and produce an electrochemical reaction that results in a desired forward flow of electrons from the anode catalyst 26 to the cathode catalyst 24. The amount of the reactant gas $R_1$ consumed by the cathode catalyst 24 corresponds to a threshold amount of the reactant gas $R_2$ needed at the anode catalyst 26 to generate the forward flow of electrons. In other portions of the fuel cell 10, such as near the exit 40 or near localized maldistributions of reactant gases, the partial pressure of at least the reactant gas $R_2$ is relatively lower. If the partial pressure of the reactant gas $R_2$ is below the threshold (e.g., fuel starvation), the electrochemical reaction produces an undesired reverse flow of electrons from the cathode catalyst 24 to the anode catalyst 26.

In the illustrated example, the portion 42 of the fuel cell 10 receives an expected partial pressure or concentration of the reactant gas $R_2$ that is generally lower than the partial pressure near the entrance 38. In this example, the portion 42 includes a feature that restricts the amount of reactant gas $R_1$ consumed at the cathode catalyst 24 in the electrochemical reaction to maintain the threshold amount of reactant gas $R_2$ below the expected partial pressure of the reactant gas $R_2$. This provides the benefit of maintaining the desired forward flow of electrons from the anode catalyst 26 to the cathode catalyst 24.

Figure 3:
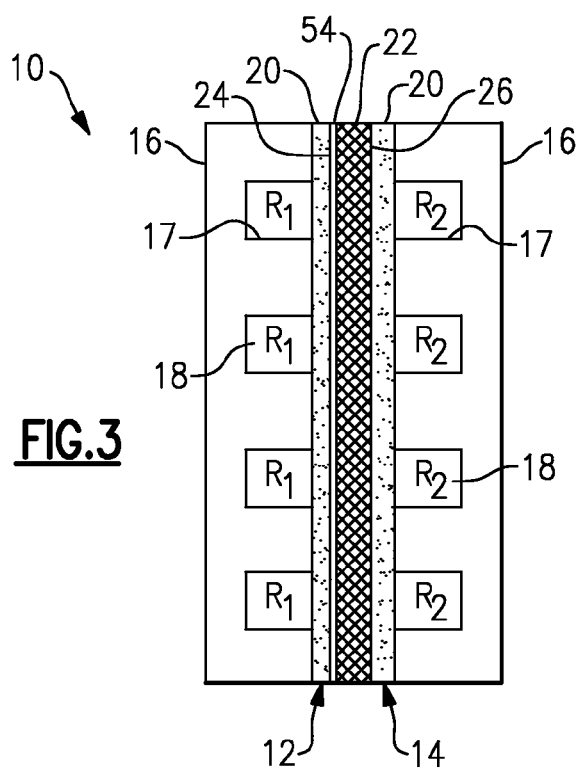
FIG. 3 is a cross-sectional view like that in FIG. 1 showing another example embodiment.

FIG. 3 illustrates one example feature for controlling the consumption of reactant gas $R_1$. In this example, the cathode side 12 includes a barrier layer 54 between the PEM 22 and the cathode catalyst 24. In one example, the barrier layer 54 comprises a carbon ionomer material.

The barrier layer 54 inhibits mass transport of catalyzed reactant gas $R_1$ from the cathode catalyst 24 to the PEM 22 (i.e., oxygen cross-over through the PEM 22 is restricted). This reduces the amount of catalyzed reactant gas $R_1$ available in the electrochemical reaction and, in turn, reduces the threshold amount of the reactant gas $R_2$ needed to generate the forward flow of electrons. This provides the benefit of keeping the threshold below the expected partial pressure of the reactant gas $R_2$ in the portion 42 to avoid undesired reverse electron flow, which decreases the likelihood of catalyst and carbon support degradation.

Figure 4:
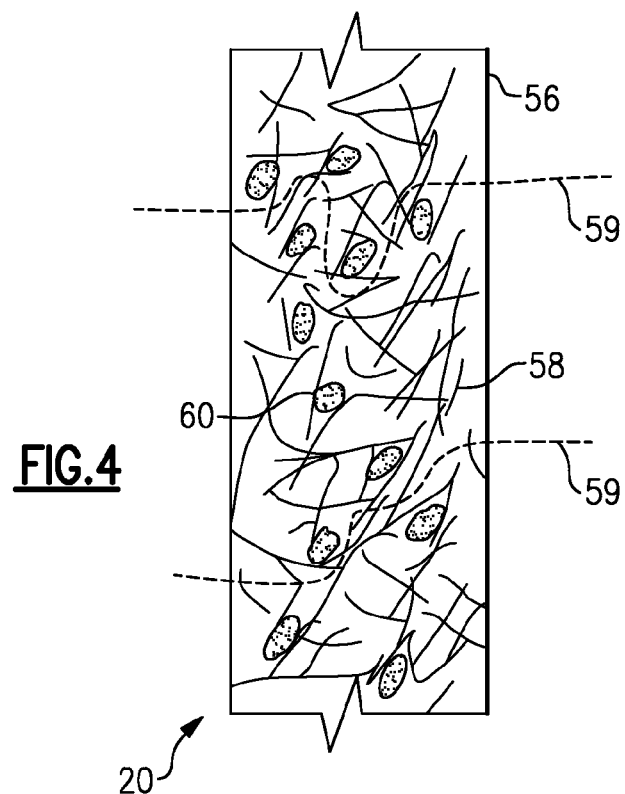
FIG. 4 is a cross-sectional view that illustrates an embodiment of a gas distribution layer having a filler material.

FIG. 4 illustrates another feature for controlling the consumption of reactant gas $R_1$. In this example, the gas exchange layer 20 on the cathode side 12 is a porous cloth layer 56, such as a carbon non-woven fabric, having fibers 58. Pores between the fibers 58 provide passages 59 between the fibers 58 that allow reactant gas $R_1$ to diffuse from the channels 18 to the cathode catalyst 24. A filler 60 at least partially blocks diffusion of reactant gas $R_1$ through the pores. In the illustrated example, the filler 60 inhibits diffusion by forcing the reactant gas $R_1$ to diffuse along a longer path around the filler 60.

In one example, the filler 60 includes a relatively inert material that is suitable for restricting reactant gas $R_1$ flow. In another example, the filler 60 includes an oxide material, such as tin oxide or other metal oxide. In another example, the filler 60 includes a polymer material, such as polytetrafluoroethylene. In another example, the filler 60 includes a carbon graphite material.

In one example, the filler 60 is deposited onto the cloth layer 56 in a known manner, such as a cloud tower or screen printing process.

In another example, the cloth layer 56 covers the portion 42 and at least one other portion of the fuel cell 10. The other portion is masked before deposition of the filler 60 to selectively deposit the filler 60 only on the portion 42 of the cloth layer 56.

In another example shown in FIG. 5, the cathode catalyst 24 includes a reduced amount of catalytic material, such as platinum, in catalyst portion 61 compared to other portions 62 of the cathode catalyst 24 in the fuel cell 10. This reduces the amount of catalyzed reactant gas $R_1$ available in the electrochemical reaction and, in turn, reduces the threshold amount of the reactant gas $R_2$ needed to generate the forward flow of electrons as described above.

In one example, the catalytic material is deposited onto a carbon support in a known manner. The rate of deposition, for example, is controlled to deposit a desired amount of catalytic material on the carbon support. In some examples, selected portions of the carbon support are masked to achieve different amounts of catalytic material in different areas of the carbon support.

Figure 6:
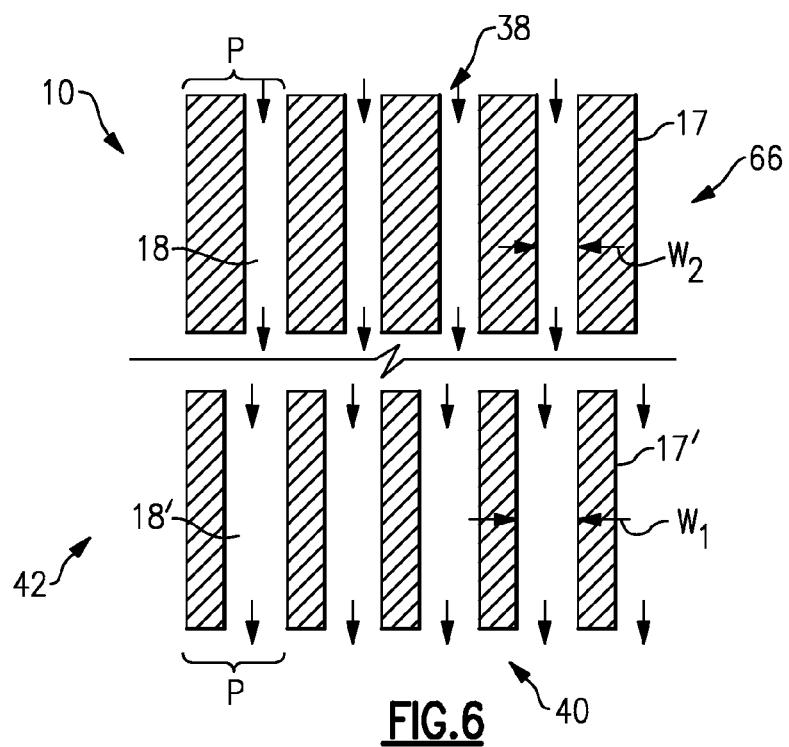
FIG. 6 is a cross-sectional view that illustrates an embodiment having channels of varying width.

FIG. 6 illustrates an example of a modified portion 42 of a flow field. In this example, the channels 18' of the portion 42 include a first width $W_1$. In another portion 66 of the flow field upstream from the portion 42, the channels 18 have a second width $W_2$ that is smaller than the first width $W_1$. In one example, the portion 42 and portion 66 have the same pitch (i.e., combined width of the channel 18 and channel wall 17 shown at P) but different channel widths.

In the illustrated example, the relatively wider channels 18' and narrower channel walls 17' in the portion 42 reduce the amount of catalyzed reactant gas $R_1$ available for the electrochemical reaction and, in turn, reduces the threshold amount of the reactant gas $R_2$ needed to generate the forward flow of electrons.

As is known, the electrochemical reaction produces a water by-product. For a porous flow field plate 16, the water is removed in a known manner over the area of the channel walls 17 to allow diffusion of the reactant gas $R_1$ to the cathode catalyst 24, and the rate of water removal corresponds to the area of the channel walls 17. An excess of water therefore restricts diffusion of the reactant gas $R_1$ to the cathode catalyst 24. In the illustrated example, the relatively narrower channel walls 17' in the portion 42 provide resistance to water removal relative to the wider channel walls 17 of the portion 66 and thereby inhibit diffusion of the reactant gas $R_1$ to the cathode catalyst 24 to restrict consumption of the reactant gas $R_1$ and thereby keep the threshold below the expected partial pressure of the reactant gas $R_2$ in the portion 42.

Figure 7A:
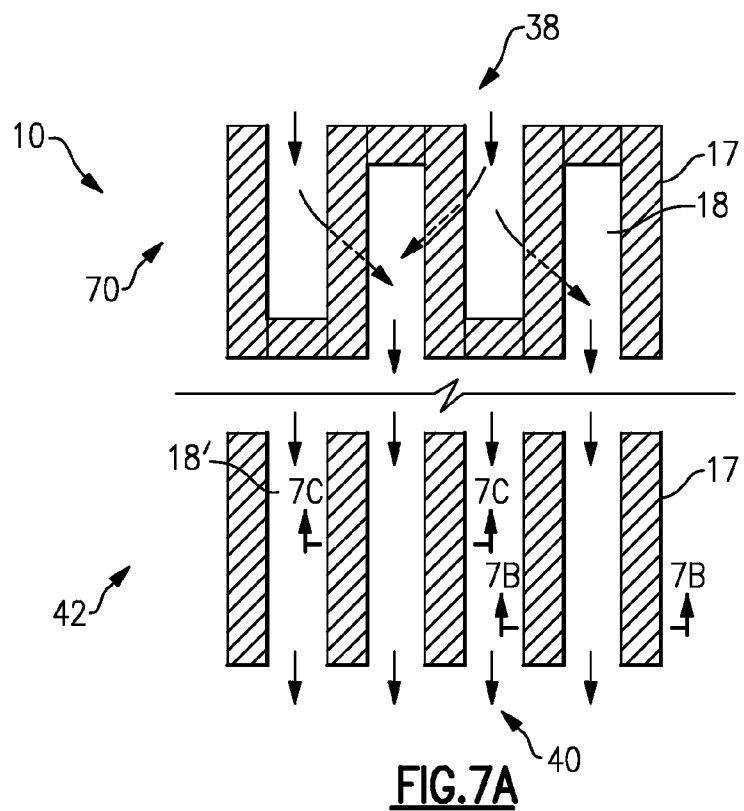
FIG. 7A is a cross-sectional view that illustrates an embodiment having interdigitated channels and parallel channels.

FIG. 7A illustrates another example portion 42. In this example, the channels 18' of the portion 42 are parallel. As is known, the primary means of reactant gas $R_1$ mass transport to the cathode catalyst 24 in a parallel channel arrangement is diffusion. In another portion 70 of the flow field upstream from the portion 42, the channels 18 are interdigitated. As is known, the primary means of reactant gas $R_1$ mass transport to the cathode catalyst 24 in an interdigitated channel arrangement is forced convection.

FIG. 7B illustrates a channel depth $D_1$ of the channels 18' of one example portion 42 and FIG. 7C illustrates a channel depth $D_2$ of the portion 70 according to the section lines shown in FIG. 7A. In the illustrated example, the channel depth $D_1$ is shallower than the channel depth $D_2$.

In the illustrated example, the parallel arrangement and shallower channel depth $D_1$ in selected channels along the portion 42 provide relatively less reactant gas $R_1$ flow into the portion 42 than in the portion 70, thereby lowering the amount of reactant gas $R_1$ available for the electrochemical reaction and, in turn, reducing the threshold amount of the reactant gas $R_2$ needed to generate the forward flow of electrons.

In some examples, the parallel arrangement and shallower channels 18' of the portion 42 have a negligible effect on the performance of the fuel cell 10 at low electric current densities, but will restrict the electric current density in the portion 42 at higher electric current levels.

FIG. 8 illustrates an example of a modified fuel cell 10. In this example, the fuel cell 10 includes a cooling passage 80 for carrying a known coolant. The coolant enters the cooling passage 80 through an entrance 82 and exits through an exit 84. In the illustrated example, the cooling passage 80 is shown schematically in a serpentine arrangement. In some examples, the cooling passage 80 is formed in the flow field plate 16, as shown in phantom in FIG. 1.

In the illustrated example, a coolant flows through the cooling passages 80 and removes heat that is generated by the electrochemical reaction. Generally, the temperature of the fuel cell 10 increases from the entrance 38 to the exit 40. Temperature tends to increases the rate of the electrochemical reaction, which increases the threshold amount of reactant gas $R_2$ needed to generate the forward flow of electrons. The portion 42 in this example is near the entrance 82 and a second portion 86 is farther away from the entrance 82. The temperature of the coolant generally increases from the entrance 82 to the exit 84 as the coolant absorbs heat from its surroundings. By having the portion 42 near the entrance 82, the portion 42 receives relatively cooler coolant rather than coolant that has been preheated by other portions of the fuel cell 10. In one example, the cooling passages 80 keep the portion 42 cooler than a portion 86 that is upstream along the direction of flow of reactant R2 from the portion 42. This provides a temperature variation that is the opposite of a typical arrangement. Moreover, this example slows the electrochemical reaction in the portion 42 and, in turn, reduces the threshold amount of the reactant gas $R_2$ needed to maintain the forward flow of electrons.

The disclosed examples restrict consumption of the reactant gas $R_1$ in a portion of the fuel cell 10 that is expected to have a relatively low partial pressure of reactant gas $R_2$ to maintain the desired forward flow of electrons from the anode catalyst 26 to the cathode catalyst 24. In some disclosed examples, the described features increase stability of the operation of the fuel cell 10 at relatively high fuel utilizations by lowering the threshold for fuel starvation without significant adverse effects on performance at low to moderate electric current densities.

Although a combination of features is shown in the illustrated examples, not all of them need to be combined to realize the benefits of various embodiments of this invention. In other words, a system designed according to an embodiment of this invention will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A device for use in a fuel cell, comprising:
a cathode catalyst for receiving a first reactant;
an anode catalyst for receiving an expected amount of a second reactant, the cathode catalyst and the anode catalyst respectively catalyze the first reactant and the second reactant to produce an electrochemical reaction that generates a flow of electrons between the anode catalyst and cathode catalyst, wherein the amount of the first reactant consumed in the electrochemical reaction corresponds to a threshold amount of the second reactant needed to generate a desired flow of the electrons; and
a first fuel cell portion including a feature that restricts consumption of the first reactant, relative to another portion of the fuel cell, to maintain the threshold amount within a desired range of the expected amount of the second reactant, wherein the first fuel cell portion and the other portion of the fuel cell each include a porous layer having openings for flow of the first reactant to the cathode catalyst, and the feature includes a filler in the porous layer of the first fuel cell portion that partially blocks the openings to restrict consumption.

2. The device as recited in claim 1, wherein the filler is selected from at least one of an oxide material, a polymer material, or a carbon material.

3. The device as recited in claim 1, wherein the device includes a cooling passage having a coolant entrance and a coolant exit, and the first fuel cell portion is nearer to the coolant entrance than the coolant exit.

4. The device as recited in claim 1, wherein the filler includes an oxide material.

5. The device as recited in claim 1, wherein the filler includes a polymer material.

6. The device as recited in claim 1, wherein the filler includes a carbon graphite material.

7. The device as recited in claim 1, wherein the filler includes tin oxide.

8. The device as recited in claim 1, wherein the filler includes a metal oxide.

9. The device as recited in claim 1, wherein the porous layer includes carbon non-woven fabric.

* * * * *